United States Patent [19]
Katzer

[11] 3,989,126
[45] Nov. 2, 1976

[54] RESILIENT RAILWAY DISC BRAKE PIVOTAL MOUNTING

[75] Inventor: Ernst Katzer, Munich, Germany

[73] Assignee: Knorr-Bremse GmbH, Munich, Germany

[22] Filed: Sept. 25, 1974

[21] Appl. No.: 509,033

[30] Foreign Application Priority Data
Sept. 28, 1973  Germany............................ 7335128

[52] U.S. Cl................................. 188/206 R; 188/59; 267/54 A; 308/28; 308/120 R; 308/238
[51] Int. Cl.²...................... B61F 13/36; F16C 13/06; F16C 27/06; F16D 65/04
[58] Field of Search ............ 267/54 A; 308/28, 238, 308/120; 188/59, 206 R

[56] References Cited
UNITED STATES PATENTS

| | | | |
|---|---|---|---|
| 1,729,328 | 9/1929 | Chilton .......................... | 267/54 A X |
| 2,308,967 | 1/1943 | Kuss............................... | 267/54 A X |
| 2,479,085 | 8/1949 | Schrange ........................ | 188/59 |
| 3,411,803 | 11/1968 | Melton et al. .................. | 308/238 X |

*Primary Examiner*—Robert J. Spar
*Assistant Examiner*—Howard Beltran
*Attorney, Agent, or Firm*—Edmund M. Jaskiewicz

[57] ABSTRACT

A disk brake for a railway vehicle is provided with a resilient pivot mount for a cross member upon the ends of which are pivotally mounted the brake levers having brake shoes which are engageable with a brake disk on either the wheel or axle of the railway vehicle. The cross piece has a bushing which is supported between two trunion bearings by a bolt passing therethrough. A pair of tapering compressible rubber sleeves are inserted into each end of the bushing to surround the bolt and the outer ends of the rubber sleeves are engaged by flanges on the ends of metal sleeves which are axially displaceable upon the bolt within the trunion bearings. The inner ends of the rubber sleeves are spaced from each other so that tightening of the bolt will press the ends of the sleeves together.

2 Claims, 2 Drawing Figures

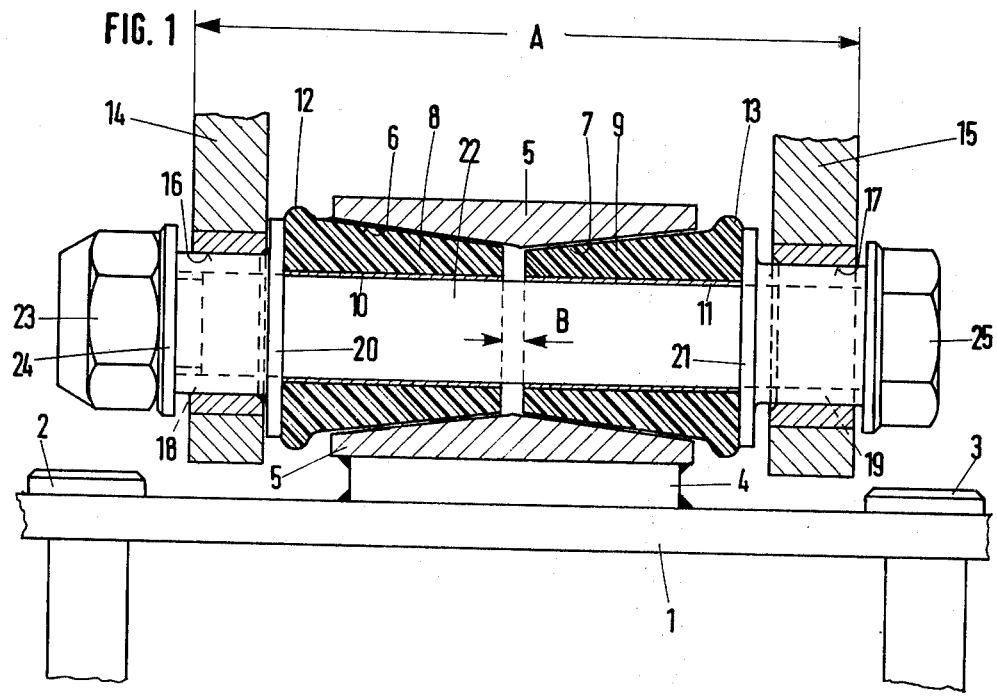
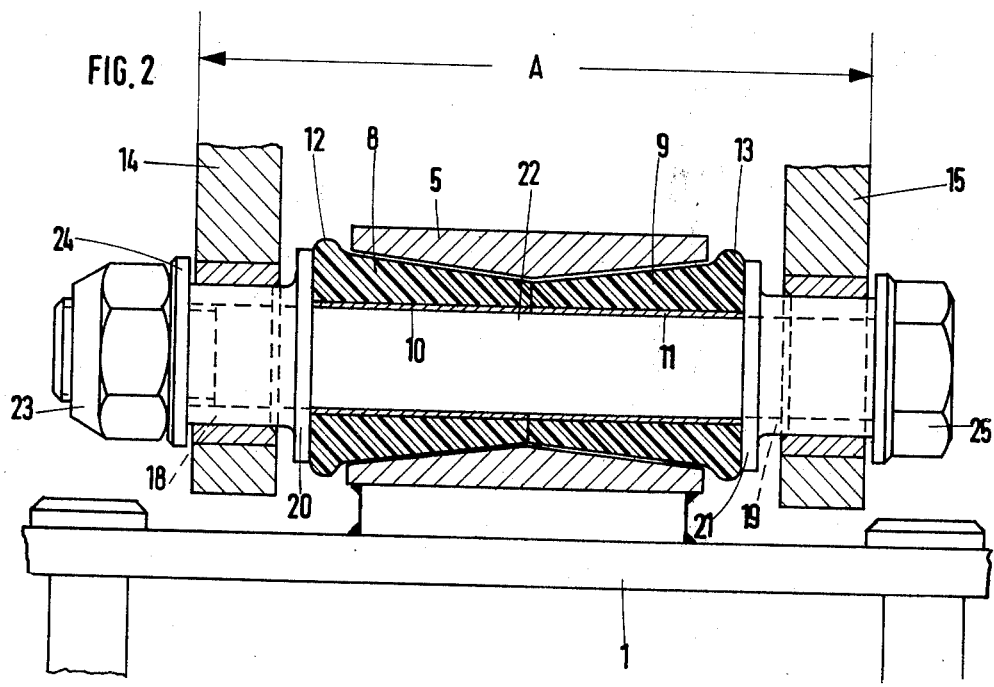

RESILIENT RAILWAY DISC BRAKE PIVOTAL MOUNTING

The present invention relates to a disk brakes for railway vehicles, more particularly, to a resilient pivot mount for a cross member upon the ends of which are pivotally mounted brake levers having brake shoes thereon engageable with the brake disk.

In a disk braking system for railway vehicles and the like, at least one rotary brake element in the form of a brake disk is mounted on either the wheel or axle of the vehicle. The brake shoes which are pressed against the brake disk to achieve the braking action are pivotally mounted on the ends of two forked levers. The forked levers are pivotally mounted on pins attached in a cross piece which is resiliently and pivotably mounted to the frame of the vehicle by means of a bushing and a bolt passing therethrough which is either in parallel with or perpendicular to the plane of the brake disk.

In railway vehicles, it is generally necessary to support various components of the brake rigging of the disk braking system from the vehicle frame or parts of the frame. Such components may include actuating elements, the brake levers, pull rods, and the traction cross piece upon which the forked brake levers may be mounted. Further, it is desirable that these brake rigging elements be resiliently mounted with respect to the frame of the vehicle so that the cross piece or the forked levers can adapt to angular variations of the brake disk encountered during movement of the vehicle.

It has been proposed to use various forms of pivot or hinged bearing mounts for such supports which mounts comprise a bolt supported between trunion bearings and a bushing mounted upon the bolt. It has been proposed to insert some form of a resilient or cushioning material between the bolt and the bushing in order to obtain a resilient or elastic adaptability to differing angular relationships. However, such proposals have not been generally satisfactory since these resilient mounts did not have the desired characteristics of a flexible mount which is simple in construction and which has maximum wear resistance.

It is therefore the principal object of the present invention to provide a resilient pivot mount for a disk brake system of a railway vehicle which provides a maximum range of flexibility, is simple in construction and installation and is capable of low wear while providing long reliable operational service.

According to one aspect of the present invention there is provided a resilient pivot mount for a cross member upon the ends of which are pivotally mounted brake levers having brake shoes thereon engageable with a brake disk mounted on either the wheel or axle of a railway vehicle. The resilient mount may comprise a pair of spaced trunion bearings mounted on the frame or a part from the frame of the railway vehicle. A bushing is attached to the cross piece and is secured by a bolt to the trunion bearings. The bushing has a bore whose diameter tapers inwardly from each end thereof toward the center of the bore. A pair of compressible rubber sleeves are inserted into both ends of the bushing to surround the bolt. Each rubber sleeve has a cylindrical bore through which passes the bolt and has a conical peripheral surface tapering inwardly from the outer end of the bushing. There is an annular bead on the outer end of each rubber sleeve. The inner ends of the sleeves are spaced apart but are capable of being pressed together upon tightening of the bolt. Within each rubber sleeve there may be provided a tubular cylindrical member whose inner ends are spaced from each other so that the degree of compression of the rubber sleeves is determined by the abutment of the inner ends of the metallic tubular members.

Other objects and advantages of the present invention will be apparent upon reference to the accompanying description when taken in conjunction with the following drawings, which are exemplary, wherein;

FIG. 1 is a longitudinal sectional view of the resilient pivot mount of the present invention showing the rubber sleeves in spaced relation; and FIG. 2 is a drawing similar to that of FIG. 1 but showing the rubber sleeves pressed together.

Proceeding next to the drawings wherein like reference symbols indicate the same parts throughout the various views, a specific embodiment of the present invention will be described in detail.

A railway vehicle disk brake incorporating the present invention includes a resilient pivot mount illustrated in FIGS. 1 and 2. In the drawings, there is shown a cross piece 1 on the ends of which are mounted pins 2 and 3 upon which two brake forked levers are pivotally mounted. The forked levers are not illustrated but these levers are each provided with brake shoes or pads which are engageable with the brake disk.

A bushing 5 is firmly secured to the cross piece 1 by means of a flat intermediate element 4. The bore of bushing 5 has conical surfaces 6 and 7 which taper inwardly from the outer ends of the bushing toward the center of the bore. Inserted into both ends of the bushing 5 are two compressible rubber sleeves 8 and 9 whose outer periphery is conical and tapering to conform with the conical surfaces 6 and 7 of the bushing.

The rubber sleeves 8 and 9 each have central cylindrical bores therethrough in which are firmly inserted metallic tubular members or casings 10 and 11. The casings 10,11 may be secured to the respective rubber sleeves 8,9 by any suitable process such as by vulcanization. The lengths of the casings 10,11 are the same as the lengths of the rubber sleeves 8 and 9 so that the ends of the casings are flush with the respective ends of the rubber sleeves.

The outer ends of the rubber sleeves 8 and 9 have the thicker walls and are provided with an annular bulge or bead 12 and 13 to function as a support or contact surface. Two trunion bearings 14 and 15 are mounted on the frame of the vehicle or on parts of the frame which are not shown. The trunion bearings 14 and 15 are spaced a predetermined fixed distance from the two ends of the bushing 5 which is positioned therebetween. The trunion bearings 14 and 15 have openings 16 and 17 therethrough in which are received longitudinally displaceable sleeves 18 and 19 which are provided respectively with external flanges 20 and 21. The flanges 20,21 are positioned on the sides of the bushing 5. A bolt 22 passes through the trunion bearing openings 16 and 17 and through the rubber sleeves 8 and 9 and is force-fitted so as to be locked upon the metal tubular members 10 and 11 of the rubber sleeves. The flanged sleeves 18 and 19 are similarly force-fitted upon the bolt 22 so as to be locked thereon. The bolt 22 has a threaded end upon which is screwed a nut 23 and upon which is also positioned a washer 24. On the other end of the bolt there is formed a bolt head 25.

FIG. 1 shows the component of the mount as assembled before the two compressible rubber sleeves 8 and 9 are pressed together by tightening of the bolt 22. The rubber sleeves 8 and 9 are inserted in an unclamped or unstressed condition into the conical interiors 6 and 7 of the bushing 5. In this assembled position the two inner faces of the thin walled ends of the rubber sleeves 8 and 9 are spaced from each other a distance indicated as B. In this assembled position the flanged ends 20 and 21 of the sleeves 18 and 19 are disposed against the beaded ends 12 and 13 of the rubber sleeves. The other ends of the sleeves 18 and 19 away from the flanges 20 and 21 engage the washer 24 of nut 23 and the bolt head 25, respectively of the bolt 22. It is also to be noted that in this position the ends of the sleeves 18 and 19 away from their respective flanges protrude outwardly or laterally of the trunion bearings 14 and 15. It is these protruding ends which contact the bolt head 25 and washer 24.

FIG. 2 shows the rubber sleeves 8 and 9 pressed together by longitudinally directed forces exerted by tightening of the bolt 22. The rubber sleeves 8 and 9 are now clamped together in the inner bore 6,7 of the bushing 5. The longitudinal force exerted by tightening of the bolt 22 is exerted by nut 23 on sleeve 18 and by the head 25 on sleeve 19 so as to axially displace these two sleeves within the openings 16 and 17 inwardly toward the compressible rubber sleeves 8 and 9. The longitudinally oriented forces are thus transmitted from the sleeve flanges 20 and 21 to the beads 12 and 13 of the rubber sleeves. During the tightening process, the inner edges of the metallic tubular inserts 10 and 11 of the compressed rubber sleeves 8 and 9 abut against each other. Upon abutment of these tubular inserts, the rubber sleeves cannot be compressed any further. Accordingly, the point at which abutment occurs can be employed as an indication of the degree to which the rubber sleeves are to be compressed. This instant of abutment can also be clearly and precisely determined using a torque wrench.

The longitudinal dimensions of the rubber sleeves 8 and 9 and adjacent flange sleeves 18 and 19 on one hand and of the spacing A of the outer surfaces of the trunion bearings 14 and 15 on the other hand are so selected that on abutment of the metal tubular members 10 and 11 the contact surface of bolt head 25 as well as that of washer 24 are positioned from the outer surface of the trunion bearing 14 and 15 at only a very small distance. As a result, after assembly and mounting of the pivot joint the tightened forces of the assembled joint will bear totally upon the rubber sleeves and will not be transferred in any part to the outer surfaces of the trunion bearings 14 and 15.

Thus it can be seen that the present invention has disclosed a resilient pivot mount which can be tightened to a predetermined uniform force without exerting any forces on the trunion bearings. Further, the mount is simple in construction and assembly and is capable of a long operating life.

It will be understood that this invention is susceptible to modification in order to adapt it to different usages and conditions, and accordingly, it is desired to comprehend such modifications within this invention as may fall within the scope of appended claims.

What is claimed is:

1. In a resilient pivot mount for a cross member upon the ends of which are pivotally mounted brake levers having brake shoes thereon engageable with a brake disc on one of the wheel and axle of a railway vehicle, the combination of a pair of space trunion bearings mounted on the frame of the vehicle, a bushing attached to the cross piece, said bushing having a bore whose diameter tapers inwardly from each end thereof toward the center of the bore, a pair of compressible rubber sleeves inserted into said bushing from each end thereof, each rubber sleeve having a cylindrical bore therethrough and a conical peripheral surface tapering inwardly from the outer end of the bushing and an annular bead on the outer end of the sleeve, an axially displaceable sleeve in each trunion bearing and having an external flange engageable with the outer beaded ends of the respective rubber sleeves, a bolt passing through said trunion bearing and rubber sleeves to support said bushing and cross piece from the frame, the inner ends of said rubber sleeves being spaced apart but capable of being pressed together upon tightening of said bolt, and a metallic tubular member within the cylindrical bore of each rubber sleeve and said bolt passing therethrough, the length of a said tubular member being equal to the length of a said rubber sleeve, the inner ends of said metallic tubular members being spaced from each other so that the compression of said rubber sleeves is limited by the abutting of said metallic tubular members.

2. In a resilient pivot mount as claimed in claim 1 and said bolt having a head on one end thereof and a nut on the other end thereof, said bolt head and nut each bearing on the ends of said flanged sleeves so that longitudinal force exerted by tightening of the bolt nut is transmitted through said flanged sleeves to the outer ends of said rubber sleeves.

* * * * *